(12) United States Patent
Fujii

(10) Patent No.: US 7,808,146 B2
(45) Date of Patent: Oct. 5, 2010

(54) COIL BOBBIN FOR MOTOR

(75) Inventor: Hirokazu Fujii, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 65 days.

(21) Appl. No.: 12/443,939

(22) PCT Filed: Oct. 1, 2007

(86) PCT No.: PCT/JP2007/069194

§ 371 (c)(1),
(2), (4) Date: Apr. 1, 2009

(87) PCT Pub. No.: WO2008/041673

PCT Pub. Date: Apr. 10, 2008

(65) Prior Publication Data

US 2010/0013344 A1     Jan. 21, 2010

(30) Foreign Application Priority Data

Oct. 3, 2006    (JP) .............................. 2006-272142

(51) Int. Cl.
*H02K 1/00* (2006.01)
(52) U.S. Cl. ...................................... 310/194
(58) Field of Classification Search ............... 310/194, 310/214, 43
See application file for complete search history.

(56) References Cited

U.S. PATENT DOCUMENTS

| 5,918,360 A * | 7/1999 | Forbes et al. ............... 29/596 |
| 6,670,737 B2 * | 12/2003 | Chen ................. 310/216.049 |
| 7,246,426 B2 * | 7/2007 | Haga .......................... 29/598 |
| 2002/0030415 A1 | 3/2002 | Morooka et al. |
| 2003/0160523 A1 * | 8/2003 | Suzuki et al. ................. 310/43 |
| 2004/0046479 A1 | 3/2004 | Haga |
| 2006/0071569 A1 * | 4/2006 | Stewart et al. .............. 310/194 |

FOREIGN PATENT DOCUMENTS

| JP | 2000-341888 A | 12/2000 |
| JP | 2002-010609 A | 1/2002 |
| JP | 2003-264945 A | 9/2003 |
| JP | 2004-104882 A | 4/2004 |
| JP | 2005-045952 A | 2/2005 |

\* cited by examiner

*Primary Examiner*—Nguyen N Hanh
(74) *Attorney, Agent, or Firm*—Global IP Counselors

(57) ABSTRACT

A coil bobbin has a body part, a first outer flange part provided at one end of the body part and a second outer flange part provided at the other end of the body part. The first outer flange part has a widthwise dimension larger than that of the second outer flange part. The first outer flange part has leg portions at both ends in the widthwise direction at the lower end. The second outer flange part has a leg portion at the lower end. The coil bobbin is preferably supported by the leg portions of the first outer flange part and the leg portion of the second outer flange part.

3 Claims, 5 Drawing Sheets

COIL BOBBIN FOR MOTOR

CROSS-REFERENCE TO RELATED APPLICATIONS

This U.S. National stage application claims priority under 35 U.S.C. §119(a) to Japanese Patent Application Nos. 2006-272142, filed in Japan on Oct. 3, 2006, the entire contents of which are hereby incorporated herein by reference.

TECHNICAL FIELD

The present invention relates to a motor coil bobbin for use in, for example, a stator of a brushless motor.

BACKGROUND ART

Conventionally, there has been a motor coil bobbin that has a tubular body part and outer flange parts provided at both ends of the body part. A coil part is wound on the outside of the coil bobbin and an iron core tooth is inserted in the coil bobbin. The tooth and the coil part are insulated from each other by the coil bobbin (refer to JP 2000-341888 A).

Both the outer flange parts are each formed in a vertically elongated rectangular shape of the same size when viewed in the axial direction of the body part, and the coil bobbin is supported on the shorter sides of both the outer flange parts.

However, since the coil bobbin is supported on the shorter sides of both the outer flange parts when winding the coil part around the coil bobbin and inserting the tooth into the coil bobbin, the coil bobbin of which a barycentric position is raised with the coil part wound therearound cannot maintain a stable posture. This has led to degraded assembling workability due to the possible occurrence of inclination or fall of the coil bobbin when the tooth is inserted.

SUMMARY OF INVENTION

Technical Problem

An object of the present invention is to provide a motor coil bobbin capable of maintaining a stable posture even if the coil part is wound and improving the assembling workability with the iron core.

Solution to Problem

In order to solve the above problem, there is provided a motor coil bobbin on outside of which a coil part is wound and in which a tooth of an iron core is inserted, the tooth and the coil part being insulated from each other, the bobbin comprising:

a tubular body part;

a first outer flange part provided at one end of the body part; and a second outer flange part provided at the other end of the body part, wherein, when viewed in an axial direction of the body part, the first outer flange part has a larger dimension of widthwise direction perpendicular to the axial direction of the body part than that of the second outer flange part, the first outer flange part has leg portions in neighborhood of at least both ends in the widthwise direction at a lower end, and the second outer flange part has a leg portion at a lower end.

With such a motor coil bobbin in accordance with the present invention, the first outer flange part has a widthwise dimension larger than that of the second outer flange part. The first outer flange part has leg portions in the neighborhoods of at least both ends in the widthwise direction at the lower end, and the second outer flange part has a leg portion at the lower end. Therefore, the coil bobbin is supported by the leg portions of the first outer flange part and the leg portion of the second outer flange part.

Therefore, the coil bobbin can maintain a stable posture even if the barycentric position of the coil bobbin is raised with the coil part wound around the coil bobbin, and the inclination and fall of the coil bobbin can be prevented when the tooth of the iron core is inserted into the coil bobbin around which the coil part is wound, allowing the assembling workability of the coil bobbin with the tooth to be improved.

In accordance with one aspect of the present invention, the leg portions of the first outer flange part are located at both ends in the widthwise direction at a lower end of the first outer flange part.

With such a motor coil bobbin in accordance with this aspect of the present invention, the leg portions of the first outer flange part are located at both ends in the widthwise direction at the lower end. Therefore, the area of contact of the installation surface of the coil bobbin with the leg portions is reduced, so that the assembling workability of the coil bobbin with the tooth is improved, and the material used for the leg portions is reduced in amount, making it possible to achieve cost reduction.

In accordance with one aspect of the present invention, a terminal pin is attached to an upper end of at least one of the first outer flange part and the second outer flange part.

With such a motor coil bobbin in accordance with this aspect of the present invention, the terminal pin is attached to the upper end of at least one of the first outer flange part and the second outer flange part. Therefore, the terminal pin is located on the opposite side of the leg portion, and the work for the terminal pin is facilitated.

ADVANTAGEOUS EFFECTS OF INVENTION

With such a motor coil bobbin in accordance with this aspect of the present invention, the first outer flange part has a widthwise dimension larger than that of the second outer flange part, and the first outer flange part has leg portions in the neighborhoods of at least both ends in the widthwise direction at the lower end. Therefore, a stable posture can be maintained even if the coil part is mounted and wound thereon, and the assembling workability with the iron core can be improved.

DESCRIPTION OF EMBODIMENTS

Figure 1:
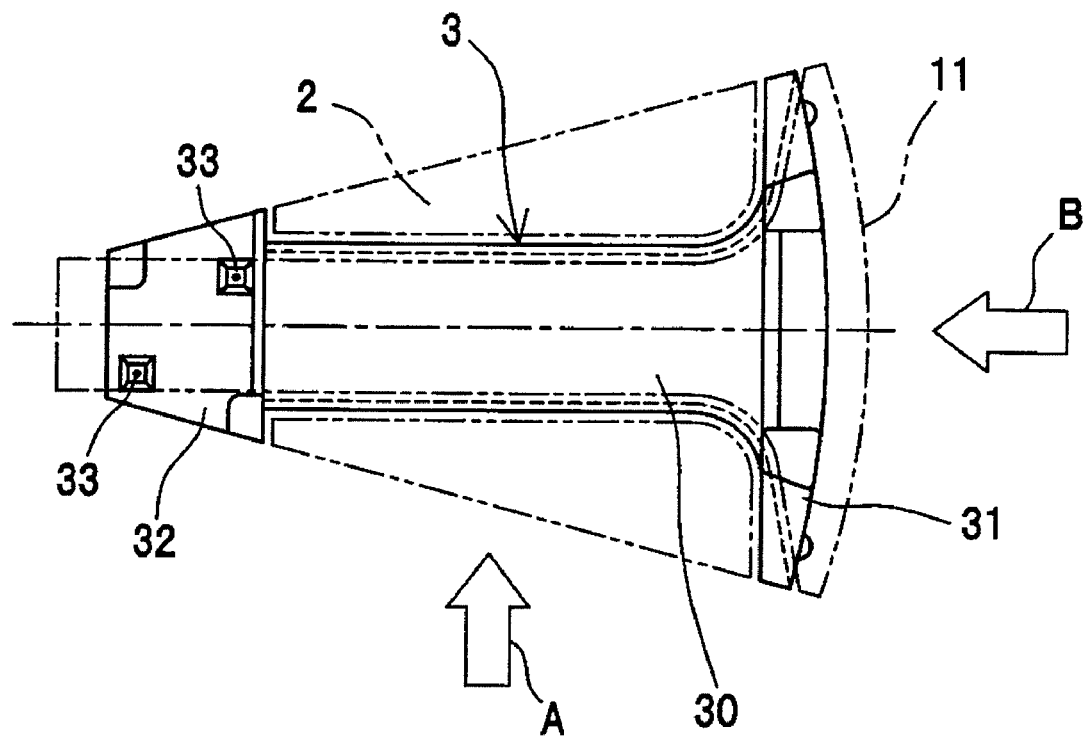
FIG. 1 is a plan view showing one embodiment of a motor coil bobbin of the invention.

The invention will be described in detail below by the embodiment shown in the drawings.

Figure 2:
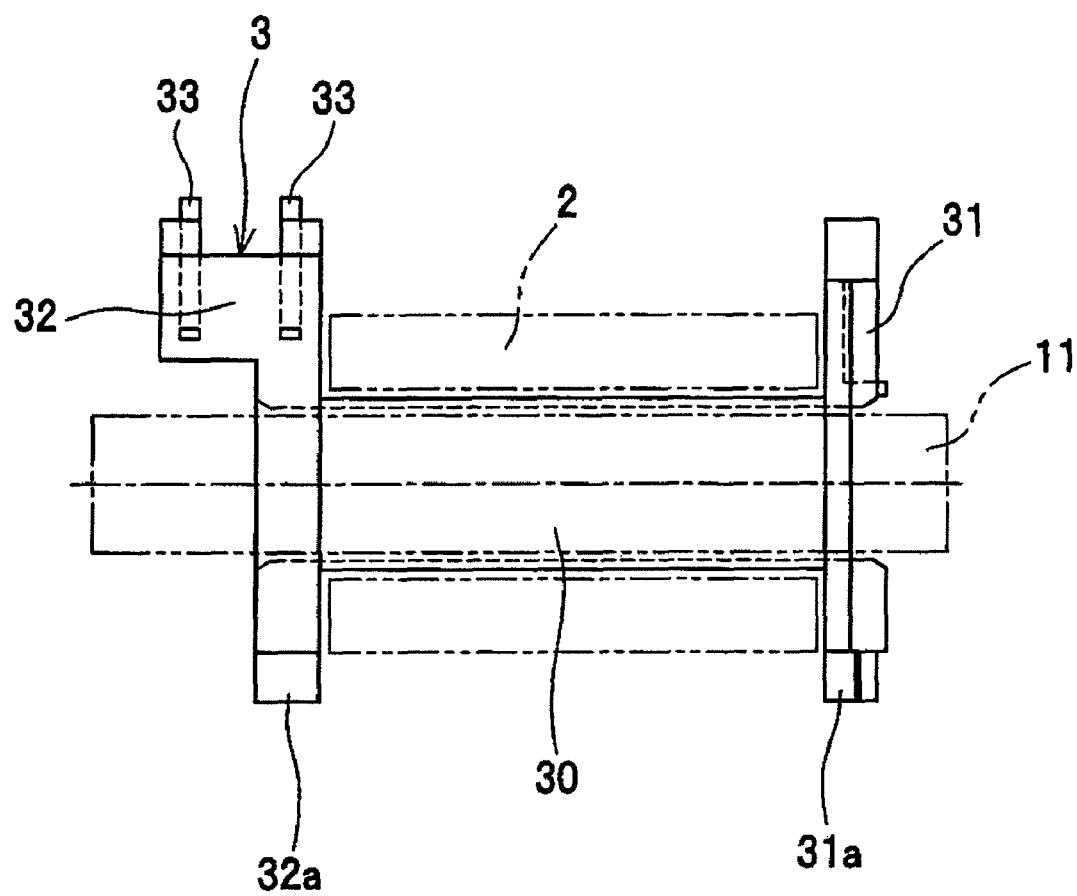
FIG. 2 is a front view viewed from a direction of arrow A of FIG. 1.
Figure 3:
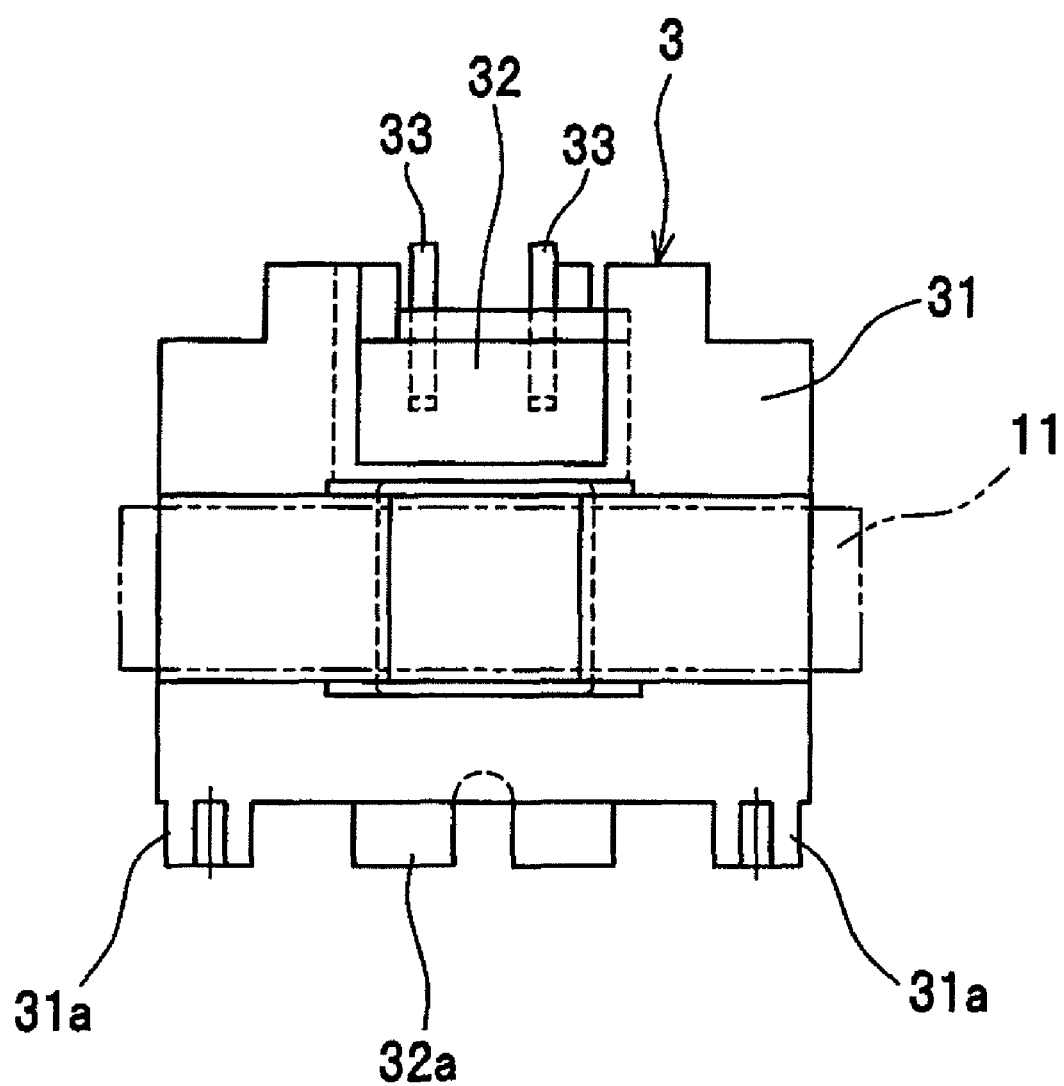
FIG. 3 is a side view viewed from a direction of arrow B of FIG. 1.

FIG. 1 shows a plan view of one embodiment of the motor coil bobbin of the invention. FIG. 2 is a front view viewed from the direction of A of FIG. 1. FIG. 3 is a side view viewed from the direction of B of FIG. 1. A coil part 2 (indicated by imaginary lines) is wound on the outside of the coil bobbin 3 and a tooth 11 (indicated by imaginary lines) of an iron core is inserted in the coil bobbin 3. The coil bobbin 3 insulates the tooth 11 and the coil part 2 from each other.

The coil bobbin 3 has a tubular body part 30, a first outer flange part 31 provided at one end of the body part 30, and a second outer flange part 32 provided at the other end of the body part 30.

The body part 30 is formed in a rectangular pipe-like shape. The first outer flange part 31 and the second outer flange part 32 are formed in generally rectangular shapes when viewed in the axial direction (direction of arrow B) of the body part 30. The first outer flange part 31 is formed in a horizontally elongated rectangular shape, and the second outer flange part 32 is formed in a vertically elongated rectangular shape.

The coil part 2 is wound outside the body part 30 between the first outer flange part 31 and the second outer flange part 32. The tooth 11 is inserted into the body part 30.

When viewed in the axial direction of the body part 30, the first outer flange part 31 has a larger dimension of widthwise direction perpendicular to the axial direction of the body part 30 than that of the second outer flange part 32.

The first outer flange part 31 has leg portions 31a at both ends in the widthwise direction at the lower end. The second outer flange part 32 has a leg portion 32a at the lower end.

When viewed in the axial direction of the body part 30, the leg portions 31a of the first outer flange part 31 are generally formed in a rectangular shape, and the leg portion 32a of the second outer flange part 32 is formed generally in a gate-like shape.

When viewed in the axial direction of the body part 30, the leg portion 32a of the second outer flange part 32 is located between two leg portions 31a, 31a of the first outer flange part 31.

The bottom surfaces of the two leg portions 31a, 31a of the first outer flange part 31 and the bottom surface of the leg portion 32a of the second outer flange part 32 are located generally in an identical plane.

The coil bobbin 3 is supported by the two leg portions 31a, 31a of the first outer flange part 31 and the leg portion 32a of the second outer flange part 32. In this case, the leg portion 32a is formed of two adjacent projecting portions, and therefore, the coil bobbin 3 is supported at four points.

Terminal pins 33 are attached to the upper end of the second outer flange part 32. An end portion of the coil part 2 is wound around the terminal pin 33, and the terminal pins 33 and the coil part 2 are soldered to a printed wiring board (not shown).

A method for assembling a motor stator by employing the coil bobbin 3 is described next.

Figure 4:
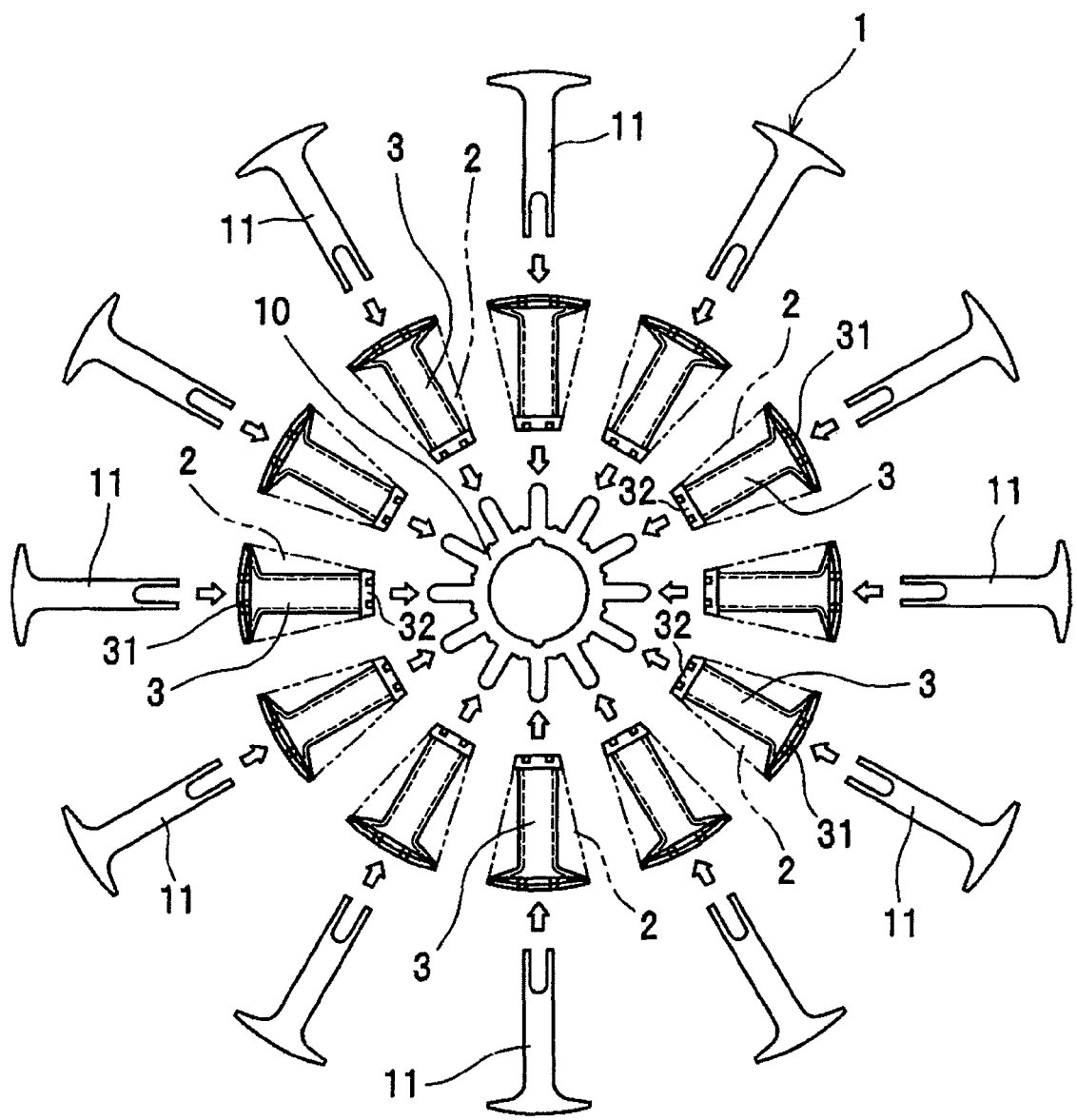
FIG. 4 is a plan view showing a state before an iron core and a coil bobbin are assembled together.

As shown in FIG. 4, the coil bobbins 3 around which the coil parts 2 are wound are each placed in such a manner that the first outer flange parts 31 are located on the outer peripheral side and the second outer flange parts 32 are located on the inner peripheral side, and the teeth 11 are inserted into the coil bobbins 3 from the first outer flange parts 31 side.

Then, the teeth 11 are moved radially inwardly together with the coil bobbins 3 toward an annular core part 10 located at the center, and the teeth 11 are fixed to the core part 10 by making projecting portions provided on the outer peripheral surface of the core part 10 fit in the recess portions of the teeth 11.

Figure 5:
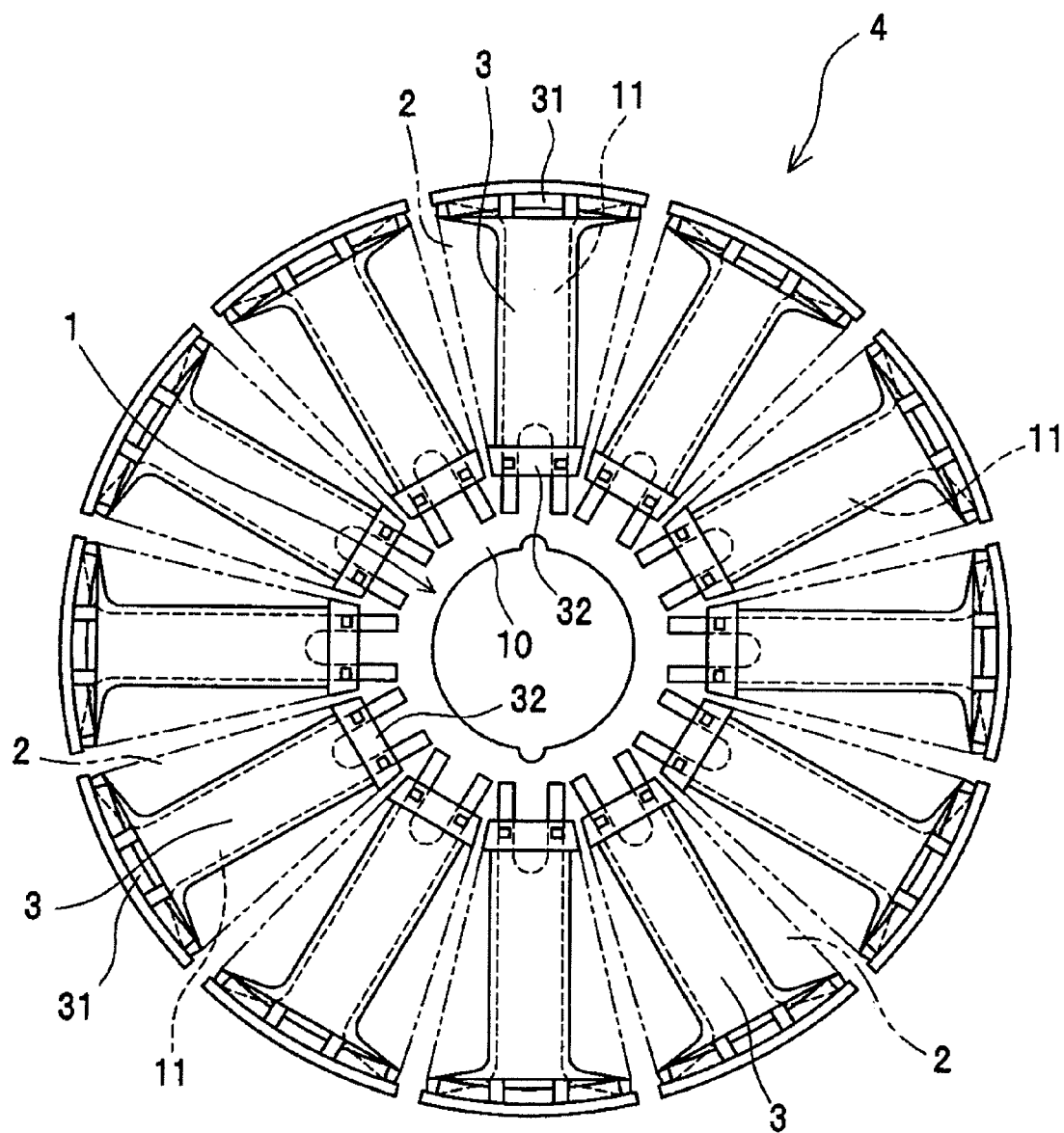
FIG. 5 is a plan view of a stator in which the iron core and the coil bobbin are assembled together.

Twelve teeth 11 are thus attached to the core part 10 together with twelve coil bobbins 3 to assemble a stator 4 as shown in FIG. 5. An iron core 1 is constituted of the twelve teeth 11 and the core part 10.

An outer rotor type motor is constituted by placing a rotor (not shown) on the outer peripheral side of the stator 4. That is, the stator 4 is applied to, for example, the brushless motor of an air conditioner.

According to the coil bobbin 3 of the above construction, the first outer flange part 31 has a widthwise dimension larger than that of the second outer flange part 32. The first outer flange part 31 has the leg portions 31a at both ends in the widthwise direction at the lower end, and the second outer flange part 32 has the leg portion 32a at the lower end. Therefore, the coil bobbin 3 is supported by the two leg portions 31a, 31a of the first outer flange part 31 and the leg portion 32a of the second outer flange part 32.

Therefore, the coil bobbins 3 can maintain stable postures even if the barycentric positions of the coil bobbins 3 are raised due to the coil parts 2 wound around the coil bobbins 3. This prevents the inclination and fall of the coil bobbins 3 when the teeth 11 of the iron core 1 are inserted into the coil bobbins 3 around which the coil parts 2 are wound, and the assembling workability of the coil bobbins 3 with the teeth 11 can be improved.

Moreover, the leg portions 31a of the first outer flange part 31 are located at both ends in the widthwise direction at the lower end. Therefore, the area of contact of the installation surfaces of the coil bobbins 3 with the leg portions 31a is reduced, so that the assembling workability of the coil bobbins 3 with the teeth 11 is improved, and the material used for the leg portions 31a is reduced, making it possible to achieve cost reduction.

Moreover, since the terminal pins 33 are attached to the upper end of the second outer flange part 32, the terminal pins 33 are located on the opposite side of the leg portion 32a, and the work for the terminal pins 33 is facilitated. For example, the work of attaching the terminal pins 33 to the coil bobbins 3, winding the end portions of the coil parts 2 around the terminal pins 33 and soldering the terminal pins 33 and the coil parts 2 to a printed wiring board (not shown) are facilitated.

It is noted that the invention is not limited to the above embodiment. For example, the shape of the coil bobbin 3 may be cylindrical or the like other than the rectangular pipe-like shape. Moreover, the shapes of the leg portions 31a, 32a may be spherical or the like.

Moreover, it is acceptable to provide the leg portions 31a of the first outer flange part 31 overall in the widthwise direction of the lower end of the first outer flange part 31, and it is only required to provide the leg portions 31a in the neighborhoods of at least both ends in the widthwise direction at the lower end of the first outer flange part 31. Therefore, the coil bobbin 3 is supported by the leg portions 31a of the first outer flange part 31 and the leg portion 32a of the second outer flange part 32, by which the stable posture can be maintained even if the coil part 2 is mounted and wound thereon and the assembling workability with the iron core 1 can be improved.

Moreover, it is acceptable to form the leg portion 32a of the second outer flange part 32 of one projecting portion, and, in this case, the coil bobbin 3 is supported at three points by the two leg portions 31a, 31a of the first outer flange part 31 and the leg portion 32a of the second outer flange part 32.

It is also acceptable to attach the terminal pins 33 at the upper end of at least one of the first outer flange part 31 and the second outer flange part 32.

What is claimed is:

1. A motor coil bobbin configured to insulate a coil part from a tooth of an iron core, the motor coil bobbin being configured receive the coil part wound on an outside thereof and to have the tooth of the iron core inserted therein, the motor coil bobbin comprising:

a tubular body part;

a first outer flange part provided at one end of the body part; and a second outer flange part provided at the other end of the body part, the first outer flange part having a first dimension that is larger than a second dimension of the second outer flange part as viewed in an axial direction of the body part, with the first and second dimensions being measured in a widthwise direction perpendicular to the axial direction, the first outer flange part having leg portions in areas at least near both ends in the widthwise direction at a lower end thereof, and the second outer flange part having a leg portion at a lower end.

2. The motor coil bobbin as claimed in claim 1, wherein the leg portions of the first outer flange part are located at both ends thereof in the widthwise direction.

3. The motor coil bobbin as claimed in claim 1, wherein at least one of the first outer flange part and the second outer flange part has a terminal pin attached to an upper end thereof.

* * * * *